(12) United States Patent
Higano (10) Patent No.: US 12,073,131 B2
(45) Date of Patent: Aug. 27, 2024

(54) IMAGE FORMING APPARATUS, CONTROL METHOD FOR CONTROLLING IMAGE FORMING APPARATUS, AND STORAGE MEDIUM, WITH IMPROVED TECHNIQUES FOR PRINTING STORED IMAGE DATA WHEN OTHER IMAGE DATA IS RECEIVED

(71) Applicant: CANON KABUSHIKI KAISHA, Tokyo (JP)

(72) Inventor: Miho Higano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/354,186

(22) Filed: Jul. 18, 2023

(65) Prior Publication Data
US 2024/0028275 A1    Jan. 25, 2024

(30) Foreign Application Priority Data
Jul. 21, 2022   (JP) ................................ 2022-116389

(51) Int. Cl.
*G06F 3/12* (2006.01)
(52) U.S. Cl.
CPC .......... *G06F 3/1219* (2013.01); *G06F 3/1242* (2013.01); *G06F 3/1254* (2013.01); *G06F 3/1267* (2013.01)

(58) Field of Classification Search
USPC .......................................................... 358/1.6
See application file for complete search history.

(56) References Cited

U.S. PATENT DOCUMENTS

| | | | | |
|---|---|---|---|---|
| 5,719,686 A | * | 2/1998 | Sakamoto .......... | H04N 1/32379 347/3 |
| 2003/0197880 A1 | * | 10/2003 | Nakao ................ | H04N 1/40012 358/1.9 |
| 2009/0303514 A1 | | 12/2009 | Puigardeu | |
| 2010/0177365 A1 | * | 7/2010 | Chung ................. | H04N 1/6033 358/504 |
| 2015/0215479 A1 | | 7/2015 | Yasinover | |
| 2016/0210088 A1 | | 7/2016 | Van Den Branden | |

FOREIGN PATENT DOCUMENTS

JP        2010284821 A      12/2010

* cited by examiner

*Primary Examiner* — Jacky X Zheng
(74) *Attorney, Agent, or Firm* — CANON U.S.A., INC. IP Division (57) ABSTRACT

An image forming apparatus that prints a plurality of pieces of image data by placing the plurality of pieces of image data in a main scanning direction of a sheet includes a storage unit configured to store image data, and a control unit configured to control, in a case where a color mode of received image data and a color mode of image data stored in the storage unit are different from each other, whether to start printing the stored image data according to a print mode of the image forming apparatus.

12 Claims, 8 Drawing Sheets

| IMAGE DATA ID | COLOR MODE |
|---|---|
| 301 | COLOR |

FIG. 4B

| IMAGE DATA ID | COLOR MODE |
|---|---|
| 301 | COLOR |
| 302 | MONOCHROME |

FIG. 4C

| IMAGE DATA ID | COLOR MODE |
|---|---|
| 301 | COLOR |
| 302 | COLOR |

FIG. 4D

| IMAGE DATA ID | COLOR MODE |
|---|---|
| 301 | COLOR |
| 302 | COLOR |
| 303 | COLOR |

| IMAGE DATA ID | COLOR MODE |
|---|---|
| 501 | COLOR |

FIG. 6B

| IMAGE DATA ID | COLOR MODE |
|---|---|
| 501 | COLOR |
| 502 | MONOCHROME |

FIG. 6C

| IMAGE DATA ID | COLOR MODE |
|---|---|
| 502 | MONOCHROME |

FIG. 7A

| IMAGE DATA ID | COLOR MODE |
|---|---|
| 301 | GRAYSCALE (256 GRADATIONS) |

FIG. 7B

| IMAGE DATA ID | COLOR MODE |
|---|---|
| 301 | GRAYSCALE (256 GRADATIONS) |
| 302 | MONOCHROME (TWO GRADATIONS) |

FIG. 7C

| IMAGE DATA ID | COLOR MODE |
|---|---|
| 301 | GRAYSCALE (256 GRADATIONS) |
| 302 | GRAYSCALE (256 GRADATIONS) |

FIG. 7D

| IMAGE DATA ID | COLOR MODE |
|---|---|
| 301 | GRAYSCALE (256 GRADATIONS) |
| 302 | GRAYSCALE (256 GRADATIONS) |
| 303 | GRAYSCALE (256 GRADATIONS) |

FIG. 8A

| IMAGE DATA ID | COLOR MODE |
|---|---|
| 301 | MONOCHROME (SINGLE COLOR, TWO GRADATIONS) |

FIG. 8B

| IMAGE DATA ID | COLOR MODE |
|---|---|
| 301 | MONOCHROME (SINGLE COLOR, TWO GRADATIONS) |
| 302 | GRAYSCALE (SINGLE COLOR, 256 GRADATIONS) |

FIG. 8C

| IMAGE DATA ID | COLOR MODE |
|---|---|
| 301 | GRAYSCALE (SINGLE COLOR, 256 GRADATIONS) |
| 302 | GRAYSCALE (SINGLE COLOR, 256 GRADATIONS) |

FIG. 8D

| IMAGE DATA ID | COLOR MODE |
|---|---|
| 301 | GRAYSCALE (SINGLE COLOR, 256 GRADATIONS) |
| 302 | GRAYSCALE (SINGLE COLOR, 256 GRADATIONS) |
| 303 | COLOR (THREE COLORS, 256 GRADATIONS) |

FIG. 8E

| IMAGE DATA ID | COLOR MODE |
|---|---|
| 301 | COLOR (THREE COLORS, 256 GRADATIONS) |
| 302 | COLOR (THREE COLORS, 256 GRADATIONS) |
| 303 | COLOR (THREE COLORS, 256 GRADATIONS) |

IMAGE FORMING APPARATUS, CONTROL METHOD FOR CONTROLLING IMAGE FORMING APPARATUS, AND STORAGE MEDIUM, WITH IMPROVED TECHNIQUES FOR PRINTING STORED IMAGE DATA WHEN OTHER IMAGE DATA IS RECEIVED

BACKGROUND OF THE INVENTION

Field of the Invention

The present invention relates to an image forming apparatus, a control method for controlling an image forming apparatus, and a storage medium.

Description of the Related Art

There is known an image forming apparatus such as a printer or a copying machine that temporarily stores image data received from a host apparatus in a non-volatile memory, such as a hard disk, built into the image forming apparatus, appropriately reads the image data stored in the non-volatile memory, and prints out the image data. Among image forming apparatuses of this type, an image forming apparatus such as a large-format printer that prints image data using a large sheet to print a poster is recently prevalent. The large-format printer uses a roll of paper as a sheet and normally prints image data by arranging the image data in the conveying direction (the vertical direction) of the sheet.

If a roll of paper having a width that is very large relative to the width of image data is set in such an image forming apparatus, nothing is printed from the end of the printed image to the end of the sheet in the main scanning direction (the horizontal direction) of the sheet orthogonal to the conveying direction of the sheet, and the waste of the sheet occurs. Accordingly, a function called nesting printing for preventing the waste of a sheet by storing a plurality of pieces of image data in a non-volatile memory, such as a hard disk, and placing the plurality of pieces of image data in the main scanning direction (the horizontal direction) of the sheet is known.

In the nesting printing, the image forming apparatus waits to receive next image data and waits for printing until the width of the sheet is filled with pieces of image data in the main scanning direction of the sheet. If, however, the image forming apparatus receives image data for which a print setting different from that of already received image data waiting to be printed is made, the image forming apparatus starts printing these pieces of image data even in a case where the margin width in the main scanning direction of the sheet is great. Japanese Patent Application Laid-Open No. 2010-284821 discusses an image forming apparatus that, in a case where different printing grades are set for pieces of image data, enables nesting printing by changing and unifying the printing grades of the pieces of image data.

Normally, if image data of a single print page is loaded into an internal memory included in an image forming apparatus, the amount of data of the image data is enormous and increases the cost of the image forming apparatus. Thus, a print page is divided into a plurality of band areas, and the image forming apparatus performs various types of image processing such as a rasterization process for rasterizing print data into bitmap image data, a color conversion process, and a binarization process in band units. Generally, the same image processing is applied to a single band area, and therefore, it is not possible to apply types of image processing corresponding to different print settings to a plurality of pieces of image data and place the plurality of pieces of image data in the main scanning direction (the horizontal direction) of a sheet.

In Japanese Patent Application Laid-Open No. 2010-284821, if the image forming apparatus receives image data for which a color mode different from that of already received image data waiting to be printed is set, the image forming apparatus starts printing these pieces of image data even if the margin width in the main scanning direction of the sheet is great. Thus, it is not possible to prevent the waste of a sheet.

SUMMARY OF THE INVENTION

The present invention is directed to preventing the waste of a sheet even in a case where color modes set for pieces of image data to be printed are different from each other.

According to an aspect of the present invention, an image forming apparatus that prints a plurality of pieces of image data by placing the plurality of pieces of image data in a main scanning direction of a sheet includes a storage unit configured to store image data, and a control unit configured to control, in a case where a color mode of received image data and a color mode of image data stored in the storage unit are different from each other, whether to start printing the stored image data according to a print mode of the image forming apparatus.

Further features of the present invention will become apparent from the following description of exemplary embodiments with reference to the attached drawings.

DESCRIPTION OF THE EMBODIMENTS

Exemplary embodiments of the present invention will be described below based on the drawings. The exemplary embodiments described below do not limit the present invention. Although a plurality of features is described in the exemplary embodiments, not all the plurality of features is configurations essential for the invention, and the plurality of features may be optionally combined together. Further, in the attached drawings, the same or similar components are designated by the same numerals and signs, and are not redundantly described.

Figure 1:
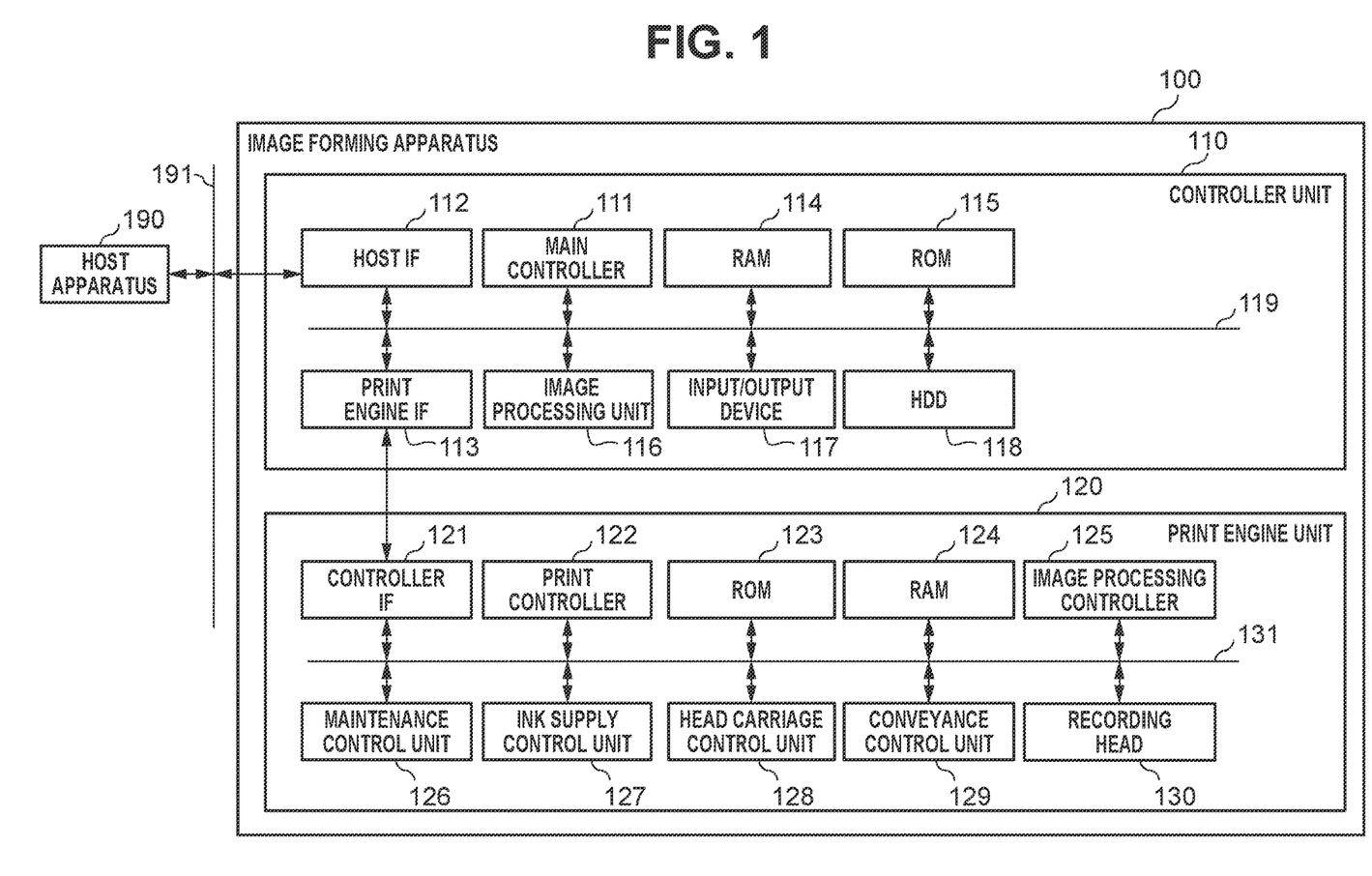
FIG. 1 is a diagram illustrating an example of a configuration of an image forming apparatus according to an exemplary embodiment.

FIG. 1 is a block diagram illustrating an example of the configuration of an image forming apparatus 100 according to an exemplary embodiment. The image forming apparatus 100 includes a controller unit 110 and a print engine unit 120. The image forming apparatus 100 can connect to a host apparatus 190 via a network 191.

The controller unit 110 includes a main controller 111, a host interface (IF) 112, a print engine IF 113, a random-access memory (RAM) 114, a read-only memory (ROM) 115, an image processing unit 116, an input/output device 117, a hard disk drive (HDD) 118, and a system bus 119. The main controller 111, the host IF 112, the print engine IF 113, the RAM 114, the ROM 115, the image processing unit 116, the input/output device 117, and the HDD 118 are connected together via the system bus 119 so that these components can communicate with each other.

For example, the main controller 111 is configured by a central processing unit (CPU). According to a program and various parameters stored in the ROM 115, the main controller 111 controls the operation of the entirety of the image forming apparatus 100 using the RAM 114 as a work area. For example, if image data is input from the host apparatus 190 via the host IF 112, then according to an instruction from the main controller 111, the image processing unit 116 performs predetermined image processing on the received image data. Then, the main controller 111 transmits the image data subjected to the image processing to the print engine unit 120 via the print engine IF 113.

The host IF 112 is an interface for transmitting and receiving various pieces of data to and from the host apparatus 190 via the network 191. The print engine IF 113 is an interface for transmitting and receiving various pieces of data to and from the print engine unit 120. The RAM 114 is used as a work area for the main controller 111. The RAM 114 is also used as a storage area for various pieces of received data. The RAM 114 can also store various pieces of setting data. The ROM 115 stores a program to be executed by the main controller 111 and various pieces of data required for various operations of the image forming apparatus 100.

The image processing unit 116 performs various types of image processing. For example, the image processing unit 116 performs the process of rasterizing (converting) image data represented by a page description language into bitmap image data and the process of converting the color space (e.g., YCbCr) of input image data into a standard red, green, and blue (RGB) color space (e.g., sRGB). The image processing unit 116 performs a variety of types of image processing, such as resolution conversion into the number of effective pixels (on which the image forming apparatus 100 can perform a printing process), image analysis, image correction, and generation of a single piece of image data by combining a plurality of pieces of image data, where necessary. Pieces of image data obtained by these types of image processing are stored in the RAM 114.

The input/output device 117 includes a hardware key and a touch panel for a user to perform various operations, and a display unit that displays various pieces of information to the user (notifies the user of the various pieces of information). The input/output device 117 may also notify the user of the information by outputting a sound (a buzzer sound or an audio) based on sound information from an audio generator. The HDD 118 is a non-volatile storage area, and a program to be executed by the main controller 111, image data, and setting information for various operations of the image forming apparatus 100 can be stored in or read from the HDD 118. The HDD 118 is an example of a storage unit. Alternatively, another large-capacity storage device, such as a flash memory, may be used instead of the HDD 118.

The print engine unit 120 is a printing unit that prints an image. The print engine unit 120 includes a controller IF 121, a print controller 122, a ROM 123, a RAM 124, and an image processing controller 125. The print engine unit 120 also includes a maintenance control unit 126, an ink supply control unit 127, a head carriage control unit 128, a conveyance control unit 129, a recording head 130, and a system bus 131. The functional units 121 to 130 are connected together via the system bus 131 so that the functional units 121 to 130 can communicate with each other.

For example, the print controller 122 is configured by a CPU. According to a program and various parameters stored in the ROM 123, the print controller 122 controls the functional units included in the print engine unit 120 using the RAM 124 as a work area. For example, if various commands and image data are received via the controller IF 121, the print controller 122 stores the received various commands and image data in the RAM 124. The print controller 122 causes the image processing controller 125 to convert the image data stored in the RAM 124 into recording data so that the recording head 130 can use the image data for a recording operation. If the recording data is generated, the print controller 122 causes the recording head 130 to execute the recording operation based on the recording data. At this time, the print controller 122 requests the conveyance control unit 129 to convey a sheet. According to an instruction from the print controller 122, the recording head 130 executes the recording operation in conjunction with the operation of conveying the sheet, thereby performing a printing process.

According to the operation state, such as the maintenance state or the recording state, of the image forming apparatus 100, the head carriage control unit 128 changes the direction and the position of the recording head 130. The ink supply control unit 127 performs control so that the pressure of ink supplied to the recording head 130 falls within an appropriate range. The maintenance control unit 126 controls the cleaning of a conveying roller controlled by the conveyance control unit 129, and the cleaning of the recording head 130. The recording head 130 prints an image on a sheet based on image data. For example, the recording head 130 holds a plurality of recording heads corresponding to a plurality of colors and discharges ink in synchronization with the conveyance of the sheet, thereby forming an image on the sheet.

Although an inkjet printer using ink as a recording material has been illustrated as an example of the image forming apparatus 100 according to the present exemplary embodiment, the present invention is not limited to this. For example, the image forming apparatus 100 according to the present exemplary embodiment is applicable to image forming apparatuses using a variety of printing methods, such as thermal printers (a sublimation type and a thermal transfer type), a dot impact printer, a light-emitting diode (LED) printer, and an electrophotographic laser printer.

Although the input/output device 117 is included within the image forming apparatus 100 in the present exemplary embodiment, the present invention is not limited to this. For example, the input/output device 117 may be connected as an external component to the image forming apparatus 100 via the network 191. Alternatively, the host apparatus 190 may double as the input/output device 117. Alternatively, in addition to the input/output device 117, another input/output device may be connectable to the image forming apparatus 100 via the network 191. Although image data is stored in the RAM 114 and the RAM 124 in the present exemplary embodiment, image data may be stored in a non-volatile storage device such as an HDD.

For example, the host apparatus 190 is an external apparatus as a supply source of image data, and a printer driver is installed on the host apparatus 190. Instead of the host apparatus 190, a data provision apparatus as a supply source of image data, such as a digital camera or a smartphone, may be provided. The connection form between each device and the image forming apparatus 100 is not limited to the connection form using the network 191, and for example, each device and the image forming apparatus 100 may be connected together through wireless communication.

A program for implementing the functions of the present exemplary embodiment may be supplied to a system or an apparatus via a network or various recording media. A computer (a CPU or a microprocessor unit (MPU)) of the system or the apparatus may read the program and execute the functions or cause various mechanisms to execute the functions. This program may be executed by a single computer, or may be executed by the cooperation of a plurality of computers. Additionally, not all the processing needs to be implemented by software, and part or all of the processing may be implemented by hardware such as an application-specific integrated circuit (ASIC). Further, not only a form in which a single CPU performs all of the processing, but also a form in which a plurality of CPUs appropriately cooperates to perform the processing, or a form in which a single CPU executes any of the processing, and a plurality of CPUs cooperates to perform the other processing may be employed.

Next, the operation of the image forming apparatus 100 according to the present exemplary embodiment is described. The image forming apparatus 100 according to the present exemplary embodiment has a function called nesting printing for printing a plurality of pieces of image data by placing the plurality of pieces of image data in the main scanning direction (the horizontal direction) of a sheet orthogonal to the conveying direction (the vertical direction) of the sheet. In the present exemplary embodiment, if the image forming apparatus 100 receives pieces of image data of which print settings such as color modes are different from each other, the image forming apparatus 100 determines a printing operation according to a set print mode. A color mode is related to an output color in a case where image data is printed. In the present exemplary embodiment, examples of the color mode include monochrome, color (multicolor), and grayscale. In the following description, the monochrome has a single color and two gradations. The color has three colors and 256 gradations. The grayscale has a single color and 256 gradations. The number of gradations, 256, of each of the color and the grayscale is merely an example, and the present invention is not limited to this. The numbers of gradations of the color and the grayscale may differ from each other. The color may have four or more colors. Each of the color and the grayscale may include a plurality of color modes different in the number of gradations.

In the present exemplary embodiment, examples of the print mode include a sheet saving mode and a setting priority mode. The sheet saving mode is an example of a first mode, and the setting priority mode is an example of a second mode. The sheet saving mode is the mode of, even in a case where pieces of image data of which the color modes are different from each other are received, changing the pieces of image data of which the color modes are different from each other to the same color mode and printing the pieces of image data by arranging and placing the pieces of image data in the main scanning direction of the sheet. That is, in the sheet saving mode, even in a case where pieces of image data of which the color modes are different from each other are received, nesting printing is performed. The setting priority mode is the mode of, in a case where pieces of image data of which the color modes are different from each other are received, not printing the pieces of image data of which the color modes are different from each other by arranging the pieces of image data in the main scanning direction of the sheet, but moving and placing the pieces of image data in the conveying direction of the sheet, and printing the pieces of image data in the set color modes. The print mode is set based on a user operation and stored in the ROM 115.

Figure 2:
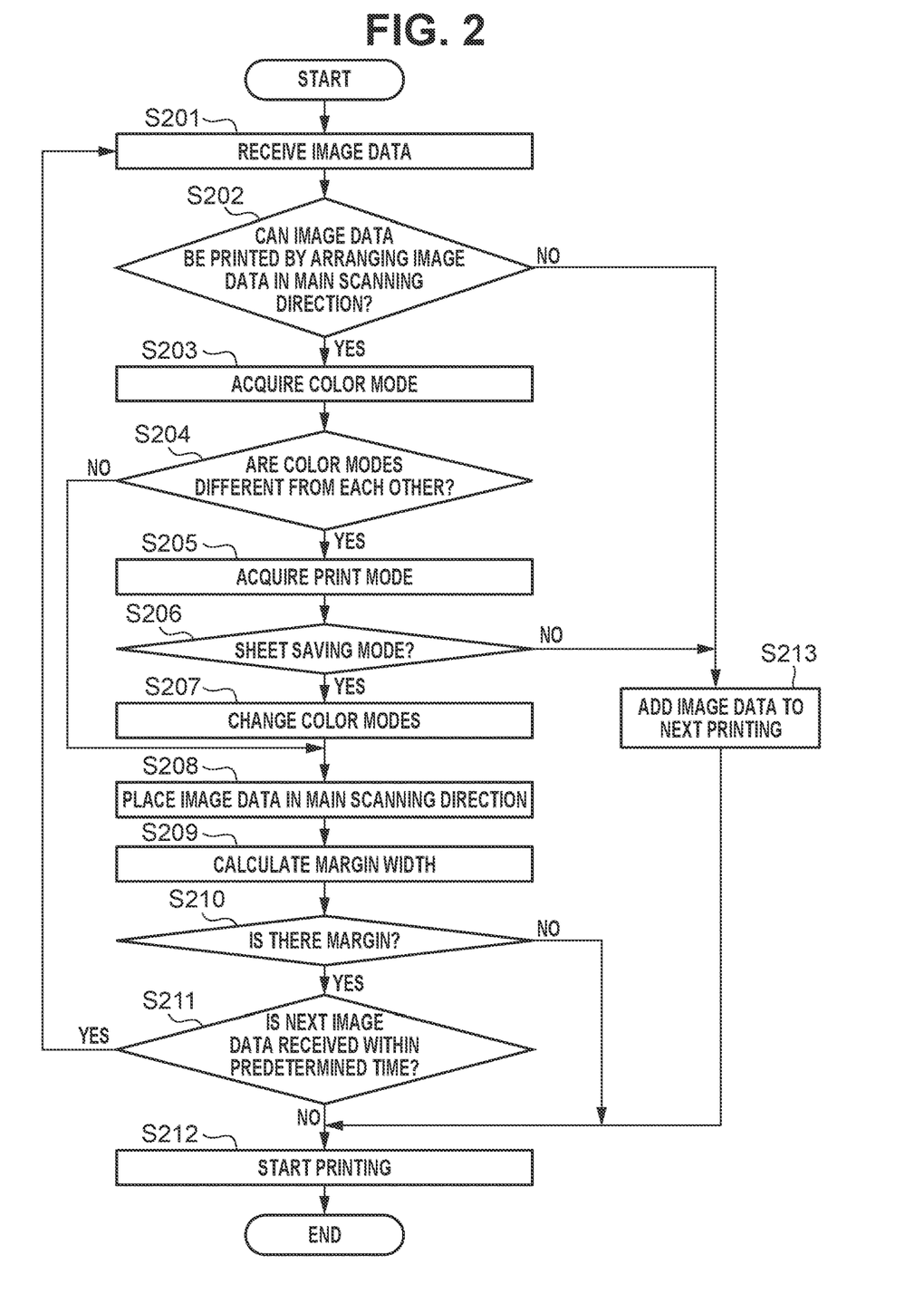
FIG. 2 is a flowchart illustrating an example of an operation of the image forming apparatus according to the exemplary embodiment.

FIG. 2 is a flowchart illustrating an example of the operation of the image forming apparatus 100 according to the present exemplary embodiment.

FIG. 2 illustrates the flow of the processing performed by the image forming apparatus 100 from the reception of image data to the start of printing.

In step S201, the image forming apparatus 100 receives image data from the host apparatus 190 via the host IF 112. The host IF 112 stores the received image data in the RAM 114 and notifies the main controller 111 that image data is newly received.

In step S202, the main controller 111 determines whether the image data received and stored in the RAM 114 in step S201 can be printed by arranging the image data in the main scanning direction of a sheet. Based on the width of the image data stored in the RAM 114 and the margin width of the sheet in the main scanning direction of the sheet, the main controller 111 determines whether the image data can be printed by arranging the image data in the main scanning direction of the sheet. If the margin width of the sheet is greater than a width required to place the image data, the main controller 111 determines that the image data can be printed by arranging the image data in the main scanning direction of the sheet. If the main controller 111 determines that the image data can be printed (YES in step S202), the processing proceeds to step S203. If the main controller 111 determines that the image data cannot be printed (NO in step S202), the processing proceeds to step S213.

In step S203, the main controller 111 acquires the color mode of the image data received and stored in the RAM 114 in step S201 and registers the color mode of the image data in a color mode management table. The color mode management table is a table for managing the color mode of image data and is held in the RAM 114. For example, the color mode management table holds information regarding an identifier (ID) for uniquely identifying image data and the color mode of the image data in association with each other.

In step S204, the main controller 111 references the color mode management table stored in the RAM 114 and determines whether the color modes of pieces of image data registered in the management table are different from each other. The main controller 111 compares the color mode of image data already received and registered in the management table with the color mode of the image data received in step S201 and registered in the management table and determines whether the color modes are different from each other. If the main controller 111 determines that the color modes of the pieces of image data registered in the management table are different from each other (YES in step S204), the processing proceeds to step S205. If, on the other hand, the main controller 111 determines that the color modes of the pieces of image data registered in the management table are the same as each other (NO in step S204), the processing proceeds to step S208. If only a single color mode of image data is registered in the color mode management table, the processing proceeds to step S208.

In step S205, the main controller 111 acquires the set print mode from the ROM 115.

In step S206, the main controller 111 determines whether the print mode acquired in step S205 is the sheet saving mode. If the main controller 111 determines that the print mode is the sheet saving mode (YES in step S206), the processing proceeds to step S207. If the main controller 111 determines that the print mode is not the sheet saving mode, i.e., the print mode is the setting priority mode in this example (NO in step S206), the processing proceeds to step S213.

In step S207, the main controller 111 changes the color modes of the pieces of image data so that the color modes of the pieces of image data registered in the color mode management table are a single color mode. The main controller 111 determines any one of the color modes of the pieces of image data registered in the management table and changes the color modes of the pieces of image data to the determined color mode. For example, according to the numbers of colors of the color modes or the numbers of gradations of the color modes, the main controller 111 determines one of the color modes of the pieces of image data registered in the management table. For example, in a case where the main controller 111 makes the determination according to the numbers of colors of the color modes, the main controller 111 determines the color mode having the most colors. In a case where the main controller 111 makes the determination according to the numbers of gradations of the color modes, the main controller 111 determines the color mode having the most gradations.

In step S208, the main controller 111 stores the image data received and stored in the RAM 114 in step S201 as an image to be placed in the main scanning direction of the sheet in the HDD 118.

In step S209, the main controller 111 calculates the margin width in the main scanning direction of the sheet after the image data stored in the HDD 118 is placed in step S208. The margin width in the main scanning direction of the sheet calculated in step S209 is held in the RAM 114. For example, the main controller 111 acquires the margin width in the main scanning direction of the sheet by subtracting a length required to place the image data stored in the HDD 118 in step S208 from the margin width calculated in the past and held in the RAM 114.

In step S210, based on the margin width in the main scanning direction of the sheet calculated in step S209, the main controller 111 determines whether there is a further margin for placing image data in the main scanning direction of the sheet. For example, if the margin width in the main scanning direction of the sheet is greater than a predetermined threshold, the main controller 111 determines that there is a further margin for placing image data. If the main controller 111 determines that there is a margin for placing image data (YES in step S210), the processing proceeds to step S211. If the main controller 111 determines that there is no margin for placing image data (NO in step S210), the processing proceeds to step S212.

In step S211, the main controller 111 waits to receive next image data and determines whether next image data is received within a predetermined time. For example, the time to wait for the reception of image data is stored as a parameter in the ROM 115. If the main controller 111 determines that next image data is received within the predetermined time (YES in step S211), the processing returns to step S201. If, on the other hand, the main controller 111 determines that next image data is not received within the predetermined time (NO in step S211), the processing proceeds to step S212. That is, if next image data is received before the predetermined time elapses, the main controller 111 executes the process of step S201. If next image data is not received even after the predetermined time elapses, the main controller 111 executes the process of step S212.

In step S212, the main controller 111 references the color mode management table stored in the RAM 114 and starts printing the pieces of image data stored as the images to be placed in the main scanning direction of the sheet in the HDD 118. According to an instruction from the main controller 111, the image processing unit 116 performs image processing on the pieces of image data stored as the images to be placed in the main scanning direction of the sheet in the HDD 118, generates a single piece of image data by combining the pieces of image data, and stores the single piece of image data in the RAM 114. The main controller 111 requests the print controller 122 to print the image data generated by combining the pieces of image data, via the print engine IF 113 and the controller IF 121. The print controller 122 receives the image data generated by combining the pieces of image data from the controller unit 110 and store the image data in the RAM 124. The print controller 122 causes the image processing controller 125 to convert the image data stored in the RAM 124 into recording data so that the recording head 130 can use the image data for a recording operation. If the recording data is generated, the print controller 122 causes the conveyance control unit 129 to convey the sheet and causes the recording head 130 to execute the recording operation based on the recording data in conjunction with the conveyance of the sheet.

In step S213, the main controller 111 performs the process of setting the image data received and stored in the RAM 114 in step S201 as image data for next printing. In this process, the main controller 111 does not arrange and place the image data received and stored in the RAM 114 in step S201 in the main scanning direction of the sheet, and stores the image data as image data to be printed by placing the image data in the conveying direction of the sheet, in the HDD 118. If the color mode of the image data is registered in the color mode management table, the main controller 111 deletes the information regarding the color mode of the image data. After the process of step S213 is performed, the processing proceeds to step S212. If the processing proceeds from step S213 to step S212, the processing returns to step S201 after the process of step S212, and the processes of step S201 and the subsequent steps are executed using the image data stored in the HDD 118 in step S213 as received image data.

The image forming apparatus 100 prints received image data by nesting printing for printing image data by arranging and placing the image data in the main scanning direction of a sheet according to the flowchart illustrated in FIG. 2, and thereby can prevent the waste of a sheet. If the color mode of the received image data and the color mode of image data already received and stored in the HDD 118 are different from each other, then according to the print mode, the image forming apparatus 100 controls whether to start printing the stored image data. Consequently, even in a case where pieces of image data of which the color modes are different from each other are received, it is possible to perform control to appropriately change the color modes of the pieces of image data so that the color modes are the same as each other, and wait without starting printing. Thus, it is possible to prevent the waste of a sheet.

In the above description, in a case where the predetermined time elapses in the state where image data is not received, or in a case where the margin in the main scanning direction of the sheet is small, or in a case where the color modes of pieces of image data are different from each other in the setting priority mode, the image forming apparatus 100 starts printing image data. The present exemplary embodiment is not limited to this. For example, in a case where an instruction to start printing image data is given by a user operation, the image forming apparatus 100 may be configured to start printing the image data.

By exemplifying first to fourth exemplary embodiments, specific examples of the operation of the image forming apparatus 100 according to the present exemplary embodiment are described below.

In the first exemplary embodiment, a case is described where the print mode is the sheet saving mode, and after first image data is received, second image data of which the color mode is different from that of the first image data is received, and further, third image data of which the color mode is different from that of the second image data is received. In the first exemplary embodiment, an example is described where, in a case where pieces of image data of which the color modes are different from each other are received and the print mode is the sheet saving mode, the color modes of the received pieces of image data are changed to the color mode having the most colors among the color modes, and the pieces of image data are printed by arranging the pieces of image data in the main scanning direction of a sheet.

Figure 3:
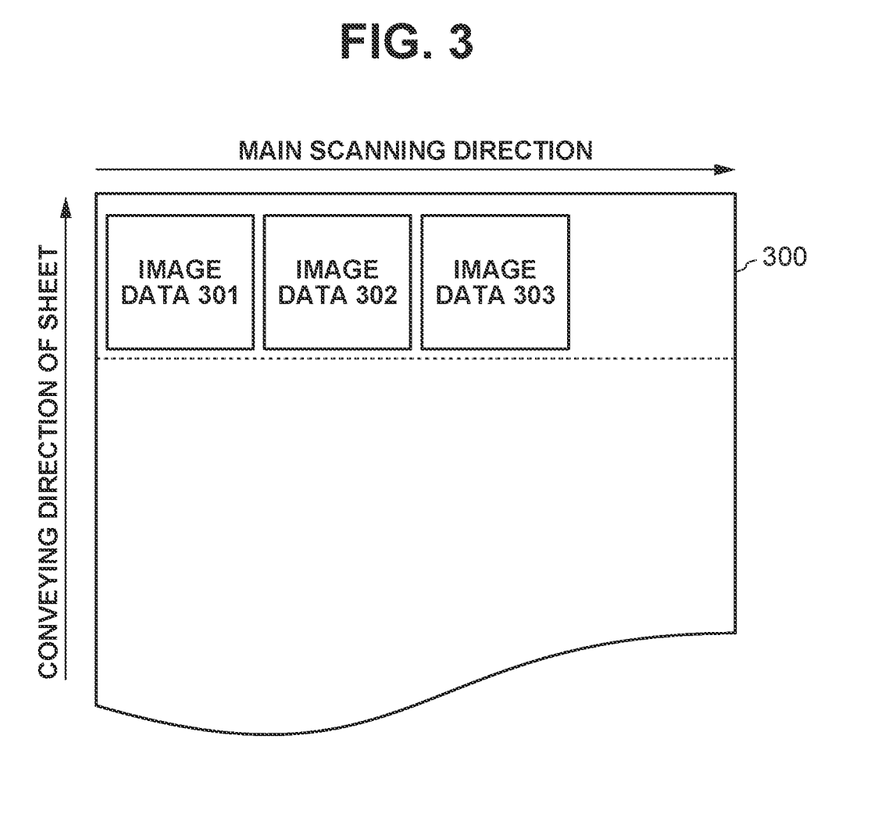
FIG. 3 is a diagram illustrating an example of placement of pieces of image data.

FIG. 3 is a schematic diagram illustrating an example of the placement of pieces of image data according to the first exemplary embodiment. The image forming apparatus 100 receives image data (first image data) 301, image data (second image data) 302, and image data (third image data) 303 in this order from the host apparatus 190 and places the image data 301, the image data 302, and the image data 303 on a sheet 300. The color modes of the received image data 301 and image data 303 are the same as each other, and the color mode of the received image data 302 is different from those of the image data 301 and the image data 303. In this example, the color modes of the received image data 301 and image data 303 are the color, and the color mode of the received image data 302 is the monochrome.

With appropriate reference to the flowchart illustrated in FIG. 2, the operation of the first exemplary embodiment of the image forming apparatus 100 is described below.

In step S201, the image forming apparatus 100 receives the image data (first image data) 301 from the host apparatus 190 via the host IF 112. The host IF 112 stores the received image data 301 in the RAM 114 and notifies the main controller 111 that the image data 301 is received.

Next, in step S202, the main controller 111 determines whether the image data 301 stored in the RAM 114 can be printed by arranging the image data 301 in the main scanning direction of the sheet 300. Since image data is not yet placed on the sheet 300, the main controller 111 determines that the image data 301 can be printed by arranging the image data 301 in the main scanning direction of the sheet 300 (YES in step S202), and the processing proceeds to step S203.

Figure 4A:
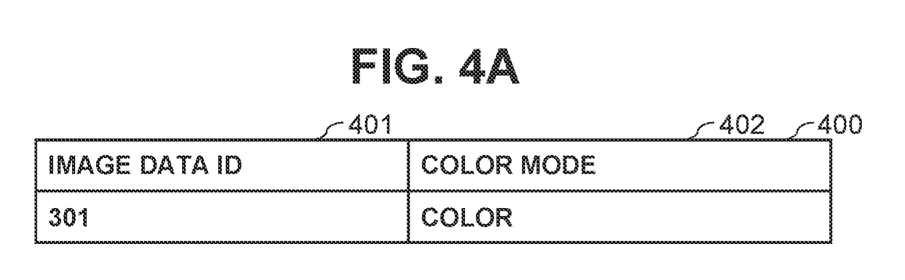
FIGS. 4A to 4D are diagrams illustrating examples of a color mode management table.

In step S203, the main controller 111 acquires the color mode of the image data 301 and registers the color mode of the image data 301 in a color mode management table 400 as illustrated in FIG. 4A. The color mode management table 400 holds information regarding an image data ID 401 and a color mode 402 of image data and is held in the RAM 114. Since the color mode of the image data 301 is the color, the color mode management table 400 holds "301" as the image data ID 401 and "color" as the color mode 402, as illustrated in FIG. 4A.

Next, in step S204, the main controller 111 references the color mode management table 400 stored in the RAM 114 and determines whether the color modes of pieces of image data are different from each other. The main controller 111 compares the color mode of image data previously received and stored in the HDD 118 (there is no image data in this example) with the color mode of the next received (currently received) image data 301 and determines whether the color modes are different from each other. In the following description, "image data previously received and stored in the HDD 118" is also referred to simply as "previously received image data". Since there is no previously received image data, the main controller 111 determines that the color modes of the pieces of image data are not different from each other (NO in step S204), and the processing proceeds to step S208.

In step S208, the main controller 111 stores the image data 301 as an image to be placed in the main scanning direction of the sheet 300 in the HDD 118.

Next, in step S209, the main controller 111 calculates the margin width in the main scanning direction of the sheet 300 after the image data 301 is placed. The main controller 111 calculates the margin width by subtracting a length required to place the image data 301 from a width that allows the placement of image data in the main scanning direction of the sheet 300, and holds the calculated margin width in the RAM 114.

Next, in step S210, based on the calculated margin width, the main controller 111 determines whether there is a further margin for placing image data in the main scanning direction of the sheet 300. In this example, there is a further margin for placing image data in the main scanning direction of the sheet 300.

The main controller 111 determines that there is a further margin for placing image data (YES in step S210), and the processing proceeds to step S211.

In step S211, the main controller 111 waits to receive next image data and determines whether next image data is received within a predetermined time. In this example, the image forming apparatus 100 receives the next image data (second image data) 302 within the predetermined time. The main controller 111 determines that the next image data 302 is received within the predetermined time (YES in step S211), and the processing returns to step S201.

Next, in step S201, the host IF 112 stores the received image data 302 in the RAM 114 and notifies the main controller 111 that the image data 302 is received.

Next, in step S202, the main controller 111 determines whether the image data 302 stored in the RAM 114 can be printed by arranging the image data 302 in the main scanning direction of the sheet 300. In this example, the image data 301 is already placed on the sheet 300, and the margin width in the main scanning direction of the sheet 300 after the image data 301 is placed is greater than a width required to place the image data 302. The main controller 111 determines that the image data 302 can be printed by arranging the image data 302 with the image data 301 in the main scanning direction of the sheet 300 (YES in step S202), and the processing proceeds to step S203.

Figure 4B:
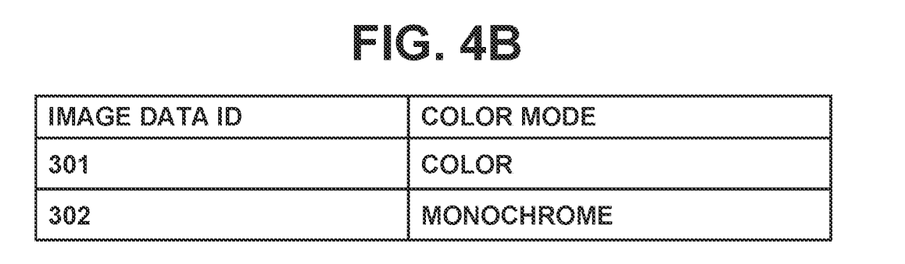

In step S203, the main controller 111 acquires the color mode of the image data 302 and registers the color mode of the image data 302 in the color mode management table 400 stored in the RAM 114 as illustrated in FIG. 4B. Since the color mode of the image data 302 is the monochrome, the color mode management table 400 stored in the RAM 114 enters the state where information indicating that the image data ID 401 is "302" and the color mode 402 is "monochrome" is added as illustrated in FIG. 4B.

Next, in step S204, the main controller 111 references the color mode management table 400 stored in the RAM 114 and determines whether the color modes of pieces of image data are different from each other. The main controller 111 compares the color mode of the previously received image data 301 with the color mode of the next received (currently received) image data 302 and determines whether the color modes are different from each other. Since the color mode of the previously received image data 301 is the color and the color mode of the next received image data 302 is the monochrome, the main controller 111 determines that the color modes are different from each other (YES in step S204), and the processing proceeds to step S205.

In step S205, the main controller 111 acquires the print mode from the ROM 115.

Next, in step S206, the main controller 111 determines whether the print mode is the sheet saving mode. In this example, the print mode is set to the sheet saving mode. The main controller 111 determines that the print mode is the sheet saving mode (YES in step S206), and the processing proceeds to step S207.

Figure 4C:
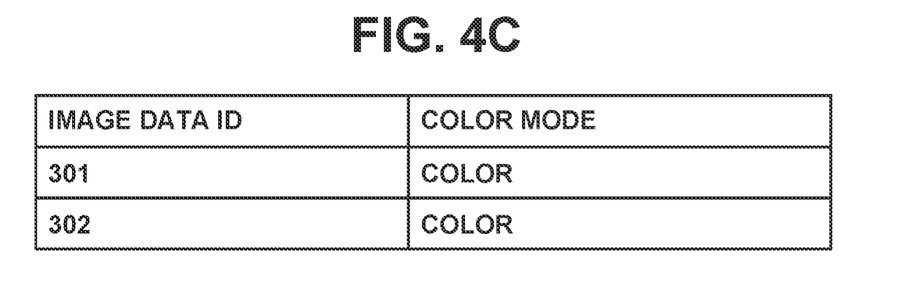

In step S207, the main controller 111 changes the color modes of the pieces of image data according to the color mode of the previously received image data 301 and the color mode of the next received image data 302. Since the color mode of the image data 301 is the color and the color mode of the image data 302 is the monochrome, the main controller 111 changes the color mode of the image data 302 to the color, which is the color mode having the most colors. Consequently, the color mode management table 400 stored in the RAM 114 enters the state where the information is changed to information indicating that the image data ID 401 is "302" and the color mode 402 is "color" as illustrated in FIG. 4C.

Next, in step S208, the main controller 111 stores the image data 302 as an image to be placed in the main scanning direction of the sheet 300 in the HDD 118.

Next, in step S209, the main controller 111 calculates the margin width in the main scanning direction of the sheet 300 after the image data 302 is placed in addition to the image data 301. The main controller 111 calculates the margin width by subtracting a length required to place the image data 302 from the margin width after the image data 301 is placed that is stored in the RAM 114, and holds the calculated margin width in the RAM 114.

Next, in step S210, based on the calculated margin width, the main controller 111 determines whether there is a further margin for placing image data in the main scanning direction of the sheet 300. In this example, there is a further margin for placing image data in the main scanning direction of the sheet 300.

The main controller 111 determines that there is a further margin for placing image data (YES in step S210), and the processing proceeds to step S211.

In step S211, the main controller 111 waits to receive next image data and determines whether next image data is received within the predetermined time. In this example, the image forming apparatus 100 receives the next image data (third image data) 303 within the predetermined time. The main controller 111 determines that the next image data 303 is received within the predetermined time (YES in step S211), and the processing returns to step S201.

Next, in step S201, the host IF 112 stores the received image data 303 in the RAM 114 and notifies the main controller 111 that the image data 303 is received.

Next, in step S202, the main controller 111 determines whether the image data 303 stored in the RAM 114 can be printed by arranging the image data 303 in the main scanning direction of the sheet 300. In this example, the image data 301 and the image data 302 are already placed on the sheet 300, and the margin width in the main scanning direction of the sheet 300 after the image data 301 and the image data 302 are placed is greater than a width required to place the image data 303. The main controller 111 determines that the image data 303 can be printed by arranging the image data 303 with the image data 301 and the image data 302 in the main scanning direction of the sheet 300 (YES in step S202), and the processing proceeds to step S203.

Figure 4D:
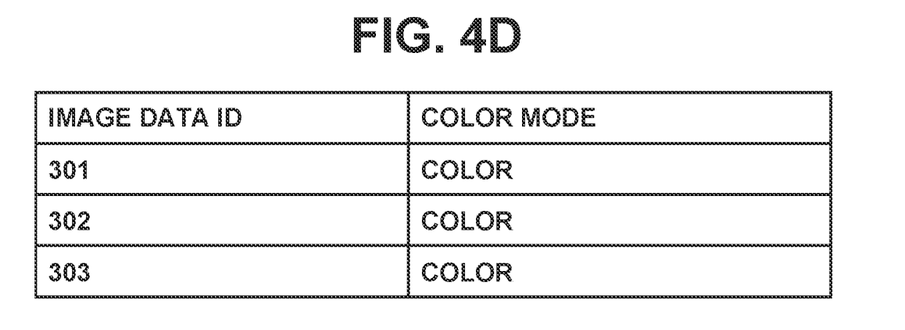

In step S203, the main controller 111 acquires the color mode of the image data 303 and registers the color mode of the image data 303 in the color mode management table 400 stored in the RAM 114 as illustrated in FIG. 4D. Since the color mode of the image data 303 is the color, the color mode management table 400 stored in the RAM 114 enters the state where information indicating that the image data ID 401 is "303" and the color mode 402 is "color" is added as illustrated in FIG. 4D.

Next, in step S204, the main controller 111 references the color mode management table 400 stored in the RAM 114 and determines whether the color modes of pieces of image data are different from each other. The main controller 111 compares the color mode of the previously received image data 302 with the color mode of the next received (currently received) image data 303 and determines whether the color modes are different from each other. Since the color mode of the previously received image data 302 is the color and the color mode of the next received image data 303 is the color, the main controller 111 determines that the color modes are not different from each other (NO in step S204), and the processing proceeds to step S208.

In step S208, the main controller 111 stores the image data 303 as an image to be placed in the main scanning direction of the sheet 300 in the HDD 118.

Next, in step S209, the main controller 111 calculates the margin width in the main scanning direction of the sheet 300 after the image data 303 is placed in addition to the image data 301 and the image data 302. The main controller 111 calculates the margin width by subtracting a length required to place the image data 303 from the margin width after the image data 301 and the image data 302 are placed that is stored in the RAM 114, and holds the calculated margin width in the RAM 114.

Next, in step S210, based on the calculated margin width, the main controller 111 determines whether there is a further margin for placing image data in the main scanning direction of the sheet 300. In this example, there is a further margin for placing image data in the main scanning direction of the sheet 300.

The main controller 111 determines that there is a further margin for placing image data (YES in step S210), and the processing proceeds to step S211.

In step S211, the main controller 111 waits to receive next image data and determines whether next image data is received within the predetermined time. In this example, the image forming apparatus 100 does not receive next image data within the predetermined time. That is, the predetermined time elapses in the state where next image data is not received. The main controller 111 determines that next image data is not received within the predetermined time (NO in step S211), and the processing proceeds to step S212.

In step S212, the main controller 111 references the color mode management table 400 illustrated in FIG. 4D that is stored in the RAM 114, and starts printing the image data 301, the image data 302, and the image data 303. According to an instruction from the main controller 111, the image processing unit 116 performs image processing on the image data 301, the image data 302, and the image data 303, generates a single piece of image data by combining the image data 301, the image data 302, and the image data 303, and stores the single piece of image data in the RAM 114. The main controller 111 requests the print controller 122 to print the image data generated by combining the image data 301, the image data 302, and the image data 303, via the print engine IF 113 and the controller IF 121. The print controller 122 stores the received image data generated by combining the image data 301, the image data 302, and the image data 303 in the RAM 124. The print controller 122 causes the image processing controller 125 to convert the stored image data generated by combining the image data 301, the image data 302, and the image data 303 into recording data so that the recording head 130 can use the image data for a recording operation. If the recording data is generated, the print controller 122 causes the conveyance control unit 129 to convey the sheet 300 and causes the recording head 130 to execute the recording operation based on the recording data in conjunction with the conveyance of the sheet 300.

As described above, even in a case where pieces of image data of which the color modes are different from each other are received, the color modes of the received pieces of image data are changed to the color mode having the most colors among the color modes if the print mode is the sheet saving mode, and the pieces of image data are arranged in the main scanning direction of a sheet. Further, by waiting for next image data, it is possible to prevent the waste of a sheet.

In the second exemplary embodiment, a case is described where the print mode is the setting priority mode, and after first image data is received, second image data of which the color mode is different from that of the first image data is received. In the second exemplary embodiment, an example is described where, in a case where pieces of image data of which the color modes are different from each other are received and the print mode is the setting priority mode, the pieces of image data of which the color modes are different from each other are not printed by arranging the pieces of image data in the main scanning direction of a sheet, and are printed in the set color modes.

Figure 5:
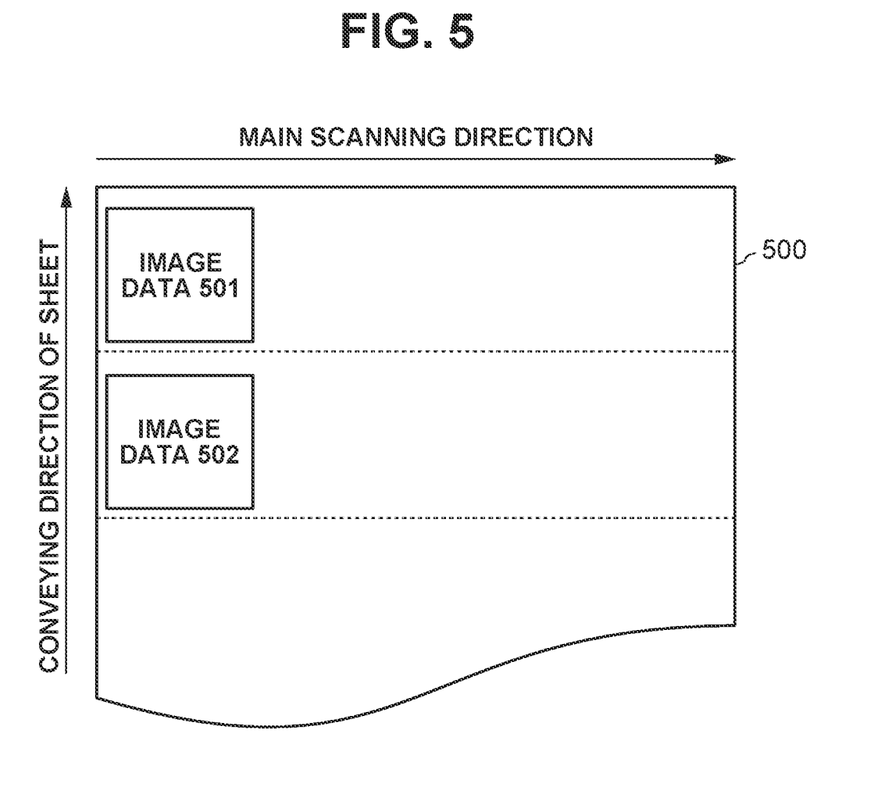
FIG. 5 is a diagram illustrating an example of placement of pieces of image data.

FIG. 5 is a schematic diagram illustrating an example of the placement of pieces of image data according to the second exemplary embodiment. The image forming apparatus 100 receives image data (first image data) 501 and image data (second image data) 502 in this order from the host apparatus 190 and places the image data 501 and the image data 502 on a sheet 500. The color mode of the received image data 502 is different from that of the image data 501. In this example, the color mode of the received image data 501 is the color, and the color mode of the received image data 502 is the monochrome.

With appropriate reference to the flowchart illustrated in FIG. 2, the operation of the second exemplary embodiment of the image forming apparatus 100 is described below.

In step S201, the image forming apparatus 100 receives the image data (first image data) 501 from the host apparatus 190 via the host IF 112. The host IF 112 stores the received image data 501 in the RAM 114 and notifies the main controller 111 that the image data 501 is received.

Next, in step S202, the main controller 111 determines whether the image data 501 stored in the RAM 114 can be printed by arranging the image data 501 in the main scanning direction of the sheet 500. Since image data is not yet placed on the sheet 500, the main controller 111 determines that the image data 501 can be printed by arranging the image data 501 in the main scanning direction of the sheet 500 (YES in step S202), and the processing proceeds to step S203.

Figure 6A:
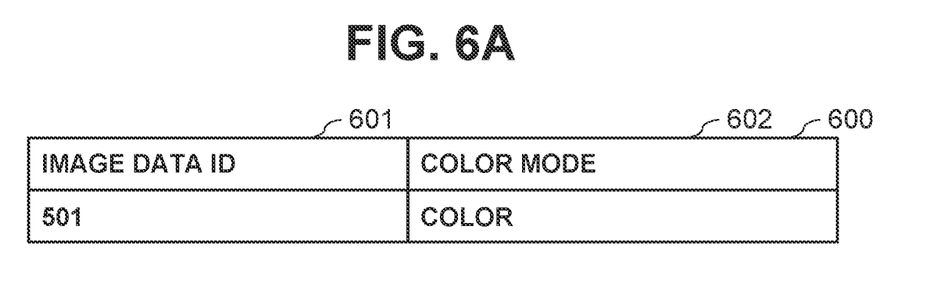
FIGS. 6A to 6C are diagrams illustrating examples of a color mode management table.

In step S203, the main controller 111 acquires the color mode of the image data 501 and registers the color mode of the image data 501 in a color mode management table 600 as illustrated in FIG. 6A. The color mode management table 600 holds information regarding an image data ID 601 and a color mode 602 of image data and is held in the RAM 114. Since the color mode of the image data 501 is the color, the color mode management table 600 enters the state where the image data ID 601 is "501" and the color mode 602 is "color" as illustrated in FIG. 6A.

Next, in step S204, the main controller 111 references the color mode management table 600 stored in the RAM 114 and determines whether the color modes of pieces of image data are different from each other. The main controller 111 compares the color mode of previously received image data (there is no image data in this example) with the color mode of the next received (currently received) image data 501 and determines whether the color modes are different from each other. Since there is no previously received image data, the main controller 111 determines that the color modes of the pieces of image data are not different from each other (NO in step S204), and the processing proceeds to step S208.

In step S208, the main controller 111 stores the image data 501 as an image to be placed in the main scanning direction of the sheet 500, in the HDD 118.

Next, in step S209, the main controller 111 calculates the margin width in the main scanning direction of the sheet 500 after the image data 501 is placed. The main controller 111 calculates the margin width by subtracting a length required to place the image data 501 from a width that allows the placement of image data in the main scanning direction of the sheet 500, and holds the calculated margin width in the RAM 114.

Next, in step S210, based on the calculated margin width, the main controller 111 determines whether there is a further margin for placing image data in the main scanning direction of the sheet 500. In this example, there is a further margin for placing image data in the main scanning direction of the sheet 500.

The main controller 111 determines that there is a further margin for placing image data (YES in step S210), and the processing proceeds to step S211.

In step S211, the main controller 111 waits to receive next image data and determines whether next image data is received within a predetermined time. In this example, the image forming apparatus 100 receives the next image data (second image data) 502 within the predetermined time. The main controller 111 determines that the next image data 502 is received within the predetermined time (YES in step S211), and the processing returns to step S201.

Next, in step S201, the host IF 112 stores the received image data 502 in the RAM 114 and notifies the main controller 111 that the image data 502 is received.

Next, in step S202, the main controller 111 determines whether the image data 502 stored in the RAM 114 can be printed by arranging the image data 502 in the main scanning direction of the sheet 500. In this example, the image data 501 is already placed on the sheet 500, and the margin width in the main scanning direction of the sheet 500 after the image data 501 is placed is greater than a width required to place the image data 502. The main controller 111 determines that the image data 502 can be printed by arranging the image data 502 with the image data 501 in the main scanning direction of the sheet 500 (YES in step S202), and the processing proceeds to step S203.

Figure 6B:
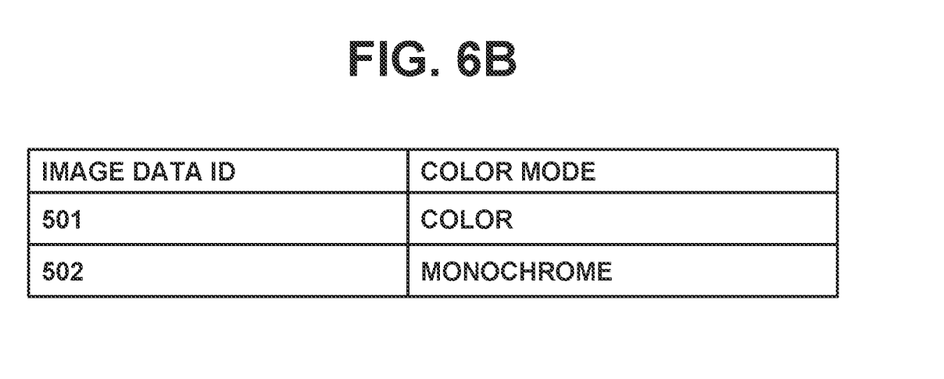

In step S203, the main controller 111 acquires the color mode of the image data 502 and registers the color mode of the image data 502 in the color mode management table 600 stored in the RAM 114 as illustrated in FIG. 6B. Since the color mode of the image data 502 is the monochrome, the color mode management table 600 stored in the RAM 114 enters the state where information indicating that the image data ID 601 is "502" and the color mode 602 is "monochrome" is added as illustrated in FIG. 6B.

Next, in step S204, the main controller 111 references the color mode management table 600 stored in the RAM 114 and determines whether the color modes of pieces of image data are different from each other. The main controller 111 compares the color mode of the previously received image data 501 with the color mode of the next received (currently received) image data 502 and determines whether the color modes are different from each other. Since the color mode of the previously received image data 501 is the color and the color mode of the next received image data 502 is the monochrome, the main controller 111 determines that the color modes are different from each other (YES in step S204), and the processing proceeds to step S205.

In step S205, the main controller 111 acquires the print mode from the ROM 115.

Next, in step S206, the main controller 111 determines whether the print mode is the sheet saving mode. In this example, the print mode is set to the setting priority mode. The main controller 111 determines that the print mode is not the sheet saving mode (NO in step S206), and the processing proceeds to step S213.

In step S213, the main controller 111 does not print the image data 502 by arranging the image data 502 with the image data 501 in the main scanning direction of the sheet 500, and stores the image data 502 as image data to be printed by placing the image data 502 in the conveying direction of the sheet 500, in the HDD 118. In this manner, the main controller 111 stores the image data 502 as image data for next printing to be performed after the image data 501 is printed, in the HDD 118. The main controller 111 also deletes the information (the image data ID 601 and the color mode 602) regarding the image data 502 from the color mode management table 600 stored in the RAM 114. Thus, the color mode management table 600 stored in the RAM 114 enters the state illustrated in FIG. 6A. After the process of step S213 is completed, the processing proceeds to step S212.

In step S212, the main controller 111 references the color mode management table 600 illustrated in FIG. 6A that is stored in the RAM 114, and starts printing the image data 501. According to an instruction from the main controller 111, the image processing unit 116 performs image processing on the image data 501 and stores the image data 501 in the RAM 114. The main controller 111 requests the print controller 122 to print the image data 501 via the print engine IF 113 and the controller IF 121. The print controller 122 stores the received image data 501 in the RAM 124. The print controller 122 causes the image processing controller 125 to convert the stored image data 501 into recording data so that the recording head 130 can use the image data 501 for a recording operation. If the recording data is generated, the print controller 122 causes the conveyance control unit 129 to convey the sheet 500 and causes the recording head 130 to execute the recording operation based on the recording data in conjunction with the conveyance of the sheet 500.

Since the image data 502 is stored as image data not to be printed by arranging the image data 502 with the image data 501 in the main scanning direction of the sheet 500 but to be printed by placing the image data 502 in the conveying direction of the sheet 500, in the HDD 118 in step S213, the processing is executed from step S201 after that.

In step S201, the main controller 111 is notified that the image data 502 is received in the HDD 118.

In step S202, the main controller 111 determines whether the image data 502 stored in the HDD 118 can be printed by arranging the image data 502 in the main scanning direction of the sheet 500. Since the image data 501 is already printed and image data is not yet placed on the sheet 500, the main controller 111 determines that the image data 502 can be printed by arranging the image data 502 in the main scanning direction of the sheet 500 (YES in step S202), and the processing proceeds to step S203.

Figure 6C:
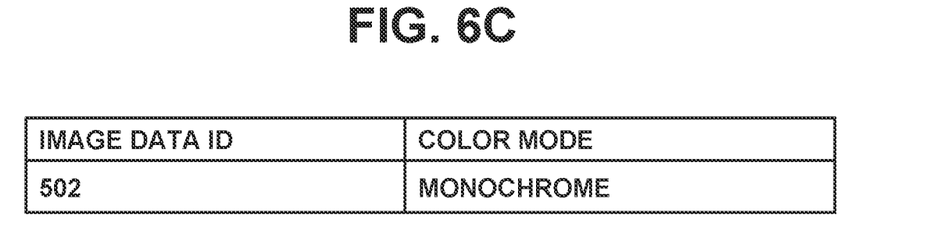

In step S203, the main controller 111 acquires the color mode of the image data 502 and registers the color mode of the image data 502 in the color mode management table 600 stored in the RAM 114 as illustrated in FIG. 6C. Since the color mode of the image data 502 is the monochrome, the color mode management table 600 stored in the RAM 114 enters the state where the image data ID 601 is "502" and the color mode 602 is "monochrome" as illustrated in FIG. 6C.

Next, in step S204, the main controller 111 references the color mode management table 600 stored in the RAM 114 and determines whether the color modes of pieces of image data are different from each other. The main controller 111 compares the color mode of previously received image data with the color mode of the next received image data 502 and determines whether the color modes are different from each other. Since the image data 501 is already printed and there is no previously received image data, the main controller 111 determines that the color modes of the pieces of image data are not different from each other (NO in step S204), and the processing proceeds to step S208.

In step S208, the main controller 111 stores the image data 502 as an image to be placed in the main scanning direction of the sheet 500 in the HDD 118.

Next, in step S209, the main controller 111 calculates the margin width in the main scanning direction of the sheet 500 after the image data 502 is placed. The main controller 111 calculates the margin width by subtracting a length required to place the image data 502 from a width that allows the placement of image data in the main scanning direction of the sheet 500, and holds the calculated margin width in the RAM 114.

Next, in step S210, based on the calculated margin width, the main controller 111 determines whether there is a further margin for placing image data in the main scanning direction of the sheet 500. In this example, there is a further margin for placing image data in the main scanning direction of the sheet 500.

The main controller 111 determines that there is a further margin for placing image data (YES in step S210), and the processing proceeds to step S211.

In step S211, the main controller 111 waits to receive next image data and determines whether next image data is received within the predetermined time. In this example, the image forming apparatus 100 does not receive next image data within the predetermined time. That is, the predetermined time elapses in the state where next image data is not received. The main controller 111 determines that next image data is not received within the predetermined time (NO in step S211), and the processing proceeds to step S212.

In step S212, the main controller 111 references the color mode management table 600 illustrated in FIG. 6C that is stored in the RAM 114, and starts printing the image data 502. According to an instruction from the main controller 111, the image processing unit 116 performs image processing on the image data 502 and stores the image data 502 in the RAM 114. The main controller 111 requests the print controller 122 to print the image data 502 via the print engine IF 113 and the controller IF 121. The print controller 122 stores the received image data 502 in the RAM 124. The print controller 122 causes the image processing controller 125 to convert the stored image data 502 into recording data so that the recording head 130 can use the image data 502 for a recording operation. If the recording data is generated, the print controller 122 causes the conveyance control unit 129 to convey the sheet 500 and causes the recording head 130 to execute the recording operation based on the recording data in conjunction with the conveyance of the sheet 500.

As described above, in a case where pieces of image data for which different color modes are set are received and in a case where the print mode is the setting priority mode, the pieces of image data are printed in the set color modes, whereby it is possible to perform printing as intended by the user.

The third exemplary embodiment is basically similar to the first exemplary embodiment. The differences from the first exemplary embodiment are described below, and portions similar to those in the first exemplary embodiment are not described. In the third exemplary embodiment, an example is described where, in a case where pieces of image data of which the color modes are different from each other are received and the print mode is the sheet saving mode, the color modes of the received pieces of image data are changed to the color mode having the most gradations among the color modes, and the pieces of image data are printed by arranging the pieces of image data in the main scanning direction of a sheet.

In the third exemplary embodiment, image data (first image data) 301, image data (second image data) 302, and image data (third image data) 303 received in this order are placed on a sheet 300 as in the example of the placement illustrated in FIG. 3. The color modes of the received image data 301 and image data 303 are the same as each other, and the color mode of the received image data 302 is different from those of the image data 301 and the image data 303. In this example, the color modes of the received image data 301 and image data 303 are the grayscale (256 gradations), and the color mode of the received image data 302 is the monochrome (two gradations).

The flow of the processing performed by the image forming apparatus 100 is basically similar to that according to the first exemplary embodiment.

FIGS. 7A to 7D are diagrams illustrating examples of a color mode management table 700 according to the third exemplary embodiment.

The color mode management table 700 holds information regarding an image data ID 701 and a color mode 702 of image data and is held in the RAM 114.

Figure 7A:
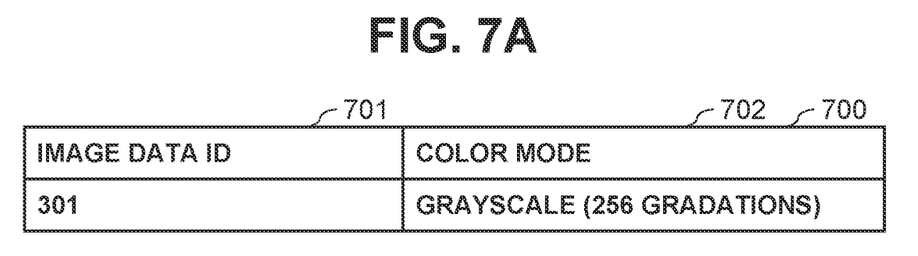
FIGS. 7A to 7D are diagrams illustrating examples of a color mode management table.

If the image forming apparatus 100 receives the image data (first image data) 301, the color mode management table 700 enters the state where the image data ID 701 is "301" and the color mode 702 is "grayscale (256 gradations)" as illustrated in FIG. 7A.

Figure 7B:
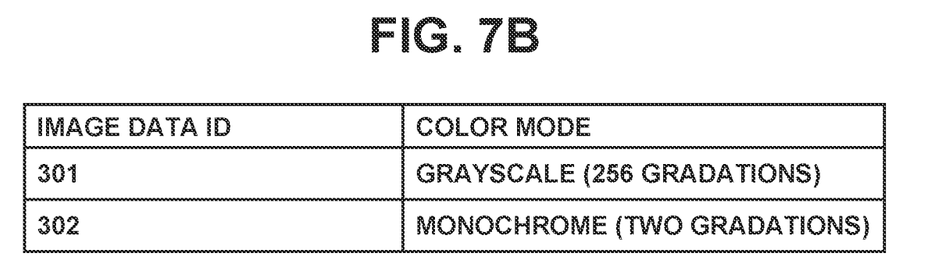

Next, if the image forming apparatus 100 receives the image data (second image data) 302, the color mode management table 700 enters the state illustrated in FIG. 7B. That is, the color mode management table 700 enters the state where information indicating that the image data ID 701 is "302" and the color mode 702 is "monochrome (two gradations)" is added.

Figure 7C:
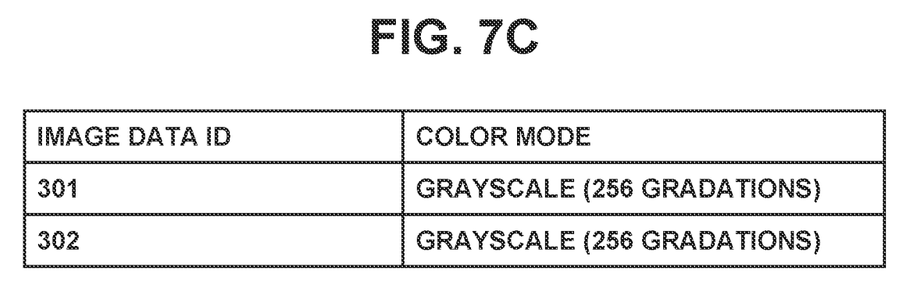

Next, since the color modes of the previously received image data 301 and the next received image data 302 are different from each other and the print mode is the sheet saving mode, the main controller 111 changes the color modes of the pieces of image data and continues to wait for printing. In this example, the main controller 111 changes the color mode of the image data 302 to the grayscale (256 gradations), which is the color mode having the most gradations, and continues to wait for printing. Consequently, the color mode management table 700 enters the state where the information is changed to information indicating that the image data ID 701 is "302" and the color mode 702 is "grayscale (256 gradations)" as illustrated in FIG. 7C.

Figure 7D:
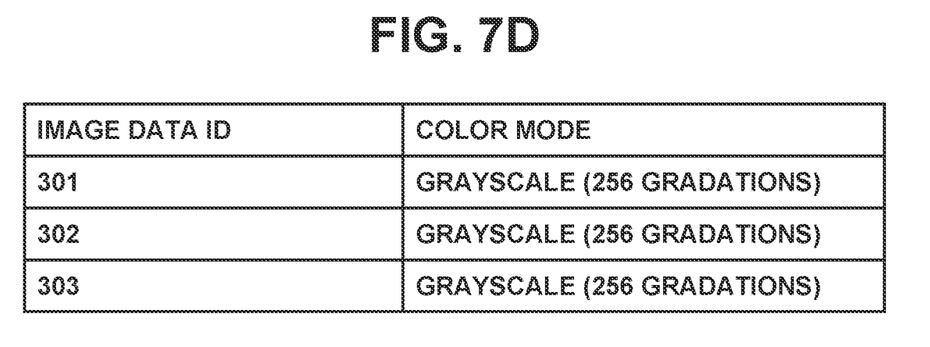

Next, if the image forming apparatus 100 receives the image data (third image data) 303, the color mode management table 700 enters the state illustrated in FIG. 7D. That is, the color mode management table 700 enters the state where information indicating that the image data ID 701 is "303" and the color mode 702 is "grayscale (256 gradations)" is added.

If the printing waiting time elapses, then as illustrated in FIG. 3, the image forming apparatus 100 unifies the color modes of the image data 301, the image data 302, and the image data 303 into "grayscale (256 gradations)" and prints the image data 301, the image data 302, and the image data 303 by arranging the image data 301, the image data 302, and the image data 303 in the main scanning direction on the sheet 300.

As described above, even in a case where pieces of image data of which the color modes are different from each other are received, the color modes of the received pieces of image data are changed to the color mode having the most gradations among the color modes if the print mode is the sheet saving mode, and the pieces of image data are arranged in the main scanning direction of a sheet. Further, by waiting for next image data, it is possible to prevent the waste of a sheet.

The fourth exemplary embodiment is basically similar to the first exemplary embodiment. The differences from the first exemplary embodiment are described below, and portions similar to those in the first exemplary embodiment are not described. In the fourth exemplary embodiment, an example is described where, in a case where pieces of image data of which the color modes are different from each other are received and the print mode is the sheet saving mode, the color modes of the received pieces of image data are changed to the color mode having the most colors and the most gradations among the received pieces of image data, and the pieces of image data are printed by arranging the pieces of image data in the main scanning direction of a sheet.

In the fourth exemplary embodiment, image data (first image data) 301, image data (second image data) 302, and image data (third image data) 303 received in this order are placed on a sheet 300 as in the example of the placement illustrated in FIG. 3. The color modes of the received image data 301, image data 302, and image data 303 are different from each other. In this example, the color mode of the received image data 301 is the monochrome (a single color, two gradations), the color mode of the received image data 302 is the grayscale (a single color, 256 gradations), and the color mode of the received image data 303 is the color (three colors, 256 gradations).

As an example where the color mode having the most colors and the most gradations is determined among the received pieces of image data, if the number of colors is n and the number of gradations is x, the color mode having the greatest value of x to the n-th power is determined as the color mode having the most colors and the most gradations.

FIGS. 8A to 8E are diagrams illustrating examples of a color mode management table 800 according to the fourth exemplary embodiment. The color mode management table 800 holds information regarding an image data ID 801 and a color mode 802 of image data and is held in the RAM 114.

Figure 8A:
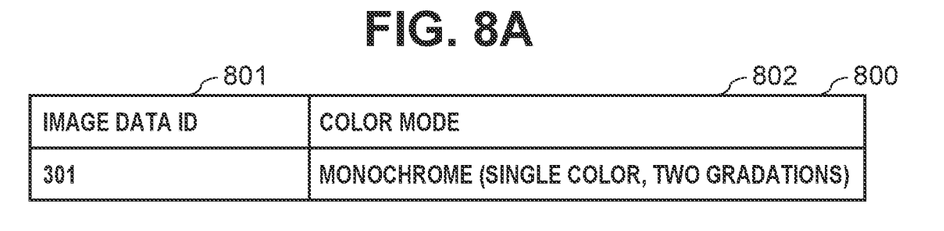
FIGS. 8A to 8E are diagrams illustrating examples of a color mode management table.

If the image forming apparatus 100 receives the image data (first image data) 301, the color mode management table 800 enters the state illustrated in FIG. 8A. That is, the color mode management table 800 enters the state where the image data ID 801 is "301" and the color mode 802 is "monochrome (single color, two gradations)".

Figure 8B:
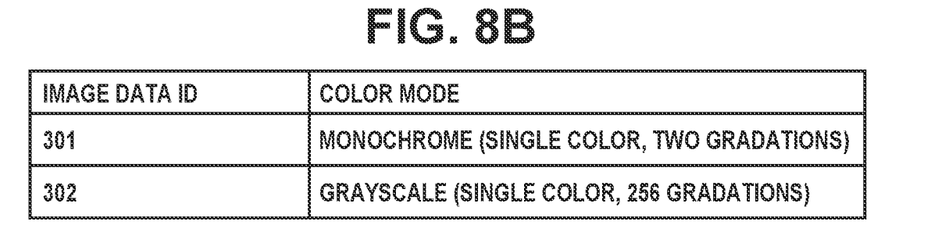

Next, if the image forming apparatus 100 receives the image data (second image data) 302, the color mode management table 800 enters the state illustrated in FIG. 8B. That is, the color mode management table 800 enters the state where information indicating that the image data ID 801 is "302" and the color mode 802 is "grayscale (single color, 256 gradations)" is added.

Figure 8C:
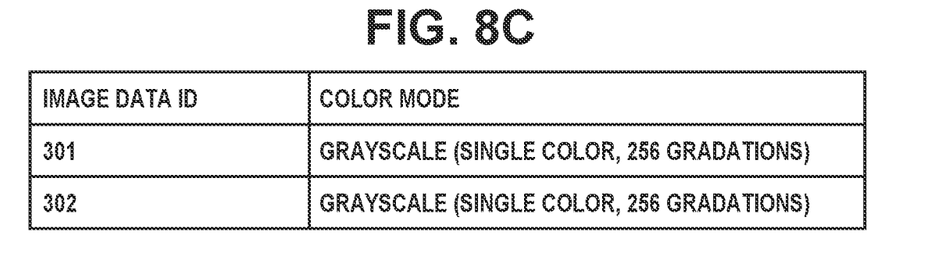

Next, since the color modes of the previously received image data 301 and the next received image data 302 are different from each other and the print mode is the sheet saving mode, the main controller 111 changes the color modes of the pieces of image data and continues to wait for printing. In this example, the main controller 111 changes the color mode of the image data 301 to the grayscale (a single color, 256 gradations), which is the color mode having the most colors and the most gradations, and continues to wait for printing. Consequently, the color mode management table 800 enters the state where the information is changed to information indicating that the image data ID 801 is "301" and the color mode 802 is "grayscale (single color, 256 gradations)" as illustrated in FIG. 8C.

Figure 8D:
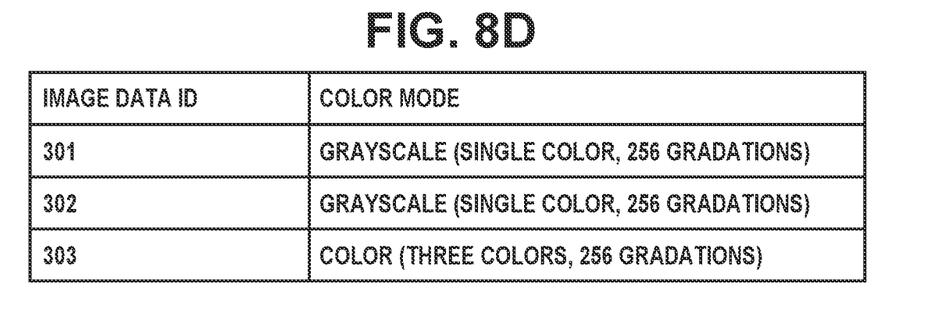

Next, if the image forming apparatus 100 receives the image data (third image data) 303, the color mode management table 800 enters the state illustrated in FIG. 8D. That is, the color mode management table 800 enters the state where information indicating that the image data ID 801 is "303" and the color mode 802 is "color (three colors, 256 gradations)" is added.

Figure 8E:
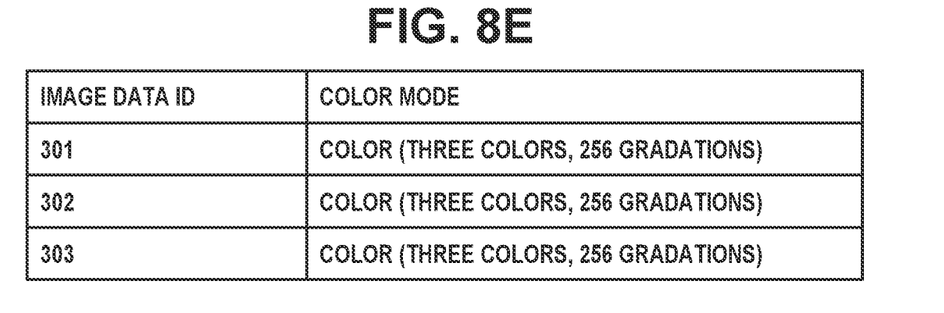

Next, since the color modes of the previously received image data 302 and the next received image data 303 are different from each other and the print mode is the sheet saving mode, the main controller 111 changes the color modes of the pieces of image data and continues to wait for printing. In this example, the main controller 111 changes the color modes of the image data 301 and the image data 302 to the color (three colors, 256 gradations), which is the color mode having the most colors and the most gradations, and continues to wait for printing. Consequently, the color mode management table 800 enters the state where the image data ID 801 is "301", "302", and "303" and the color mode 802 is "color (three colors, 256 gradations)" as illustrated in FIG. 8E.

If the printing waiting time elapses, then as illustrated in FIG. 3, the image forming apparatus 100 unifies the color modes of the image data 301, the image data 302, and the image data 303 into "color (three colors, 256 gradations)" and prints the image data 301, the image data 302, and the image data 303 by arranging the image data 301, the image data 302, and the image data 303 in the main scanning direction on the sheet 300.

As described above, even in a case where pieces of image data of which the color modes are different from each other are received, the color modes of the received pieces of image data are changed to the color mode having the most colors and the most gradations among the color modes if the print mode is the sheet saving mode, and the pieces of image data are arranged in the main scanning direction of a sheet. Further, by waiting for next image data, it is possible to prevent the waste of a sheet.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above exemplary embodiments merely illustrate specific examples for carrying out the present invention, and the technical scope of the present invention should not be interpreted in a limited manner based on these exemplary embodiments. That is, the present invention can be carried out in various ways without departing from the technical idea or the main feature of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-116389, filed Jul. 21, 2022, which is hereby incorporated by reference herein in its entirety.

What is claimed is:
1. An image forming apparatus that prints a plurality of pieces of image data by placing the plurality of pieces of image data in a main scanning direction of a sheet, the image forming apparatus comprising:
  a storage unit configured to store image data; and
  a control unit configured to control, in a case where a color mode of received image data and a color mode of image data stored in the storage unit are different from each other, whether to start printing the stored image data according to a print mode of the image forming apparatus,
  wherein in a case where the print mode is a first mode, the control unit performs control to store the received image data in the storage unit without starting printing the stored image data, and wherein in a case where the print mode is a second mode different from the first mode, the control unit performs control to start printing the stored image data.

2. The image forming apparatus according to claim 1, further comprising a change unit configured to change a color mode of image data,
  wherein in a case where the print mode is the first mode, the control unit controls the change unit to change the color mode of the received image data or the color mode of the stored image data.

3. The image forming apparatus according to claim 2, wherein in a case where the color mode of the received image data and the color mode of the stored image data are different from each other and the print mode is the first mode, the change unit changes the color modes of the received image data and the stored image data to either of the color mode of the received image data and the color mode of the stored image data.

4. The image forming apparatus according to claim 2, wherein the change unit changes the color mode of the image data to the color mode having the most colors among the color mode of the received image data and the color mode of the stored image data.

5. The image forming apparatus according to claim 2, wherein the change unit changes the color mode of the image data to the color mode having the most gradations among the color mode of the received image data and the color mode of the stored image data.

6. The image forming apparatus according to claim 2, wherein the change unit changes the color mode of image data to the color mode having the most colors and the most gradations among the color mode of the received image data and the color mode of the stored image data.

7. The image forming apparatus according to claim 1,
  wherein the first mode is a mode of printing image data by arranging and placing the image data in the main scanning direction of the sheet, and
  wherein the second mode is a mode of printing, in a case where the color mode of the received image data and the color mode of the stored image data are different from each other, the received image data by placing the received image data in a conveying direction of the sheet relative to the stored image data.

8. The image forming apparatus according to claim 1, further comprising a management table configured to manage the color mode of the stored image data.

9. The image forming apparatus according to claim 8, further comprising a comparison unit configured to reference the management table and compare the color mode of the received image data and the color mode of the stored image data.

10. The image forming apparatus according to claim 1, wherein the color modes of the pieces of image data include at least one of monochrome, color, and grayscale.

11. A control method for an image forming apparatus that prints a plurality of pieces of image data by placing the plurality of pieces of image data in a main scanning direction of a sheet, the control method comprising:
  storing image data in a storage unit; and
  in a case where a color mode of received image data and a color mode of image data stored in the storage unit are different from each other, controlling whether to start printing the stored image data according to a print mode of the image forming apparatus,
  wherein in a case where the print mode is a first mode, performing control to store the received image data in the storage unit without starting printing the stored image data, and wherein in a case where the print mode is a second mode different from the first mode, performing control to start printing the stored image data.

12. A non-transitory storage medium storing instructions for causing an image forming apparatus to execute a control process, wherein the image forming apparatus prints a plurality of pieces of image data by placing the plurality of pieces of image data in a main scanning direction of a sheet, the control process comprising:
  storing image data in a storage unit; and
  in a case where a color mode of received image data and a color mode of image data stored in the storage unit are different from each other, controlling whether to start printing the stored image data according to a print mode of the image forming apparatus,
  wherein in a case where the print mode is a first mode, the control unit performs control to store the received image data in the storage unit without starting printing the stored image data, and wherein in a case where the print mode is a second mode different from the first mode, the control unit performs control to start printing the stored image data.

* * * * *